Patented Sept. 6, 1932

1,875,997

UNITED STATES PATENT OFFICE

LAURENCE A. EDLAND, OF NORWALK, CONNECTICUT, ASSIGNOR TO R. T. VANDERBILT COMPANY, INCORPORATED, OF NEW YORK, N. Y., A CORPORATION OF NEW YORK

VULCANIZATION OF RUBBER

No Drawing. Application filed March 29, 1930. Serial No. 440,174.

This invention relates to an improved method of vulcanizing rubber and includes both the method and the new rubber products.

According to this invention tellurium and sulfur and an organic accelerator are employed in the vulcanization of rubber. The rubber mix may be milled on the rolls in the usual way. The use of high temperatures is not necessary and good cures can be effected in a short time at or below 160° C., for example at forty pounds steam pressure, i. e. 141° C., or at fifty pounds pressure, i. e. 148° C. The new vulcanized rubber produced by this new process is characterized by its good aging qualities and freedom from bloom.

In vulcanizing rubber according to the process of this invention, I use a small percentage of tellurium, for example not over 2%, together with a small percentage of sulfur, for example not over 2%, and an organic accelerator, and I have obtained excellent cures at temperatures not over 148° C., in from fifteen to forty-five minutes. The tellurium and sulfur may be added separately or they may be added in combination as tellurium sulfide. I prefer to use sulfur-bearing accelerators such as mercaptobenzothiazole, tetramethylthiuram disulfide, and the compounds of selenium or tellurium with dithio acids such as tellurium diethyldithiocarbamate. Sulfur-free accelerators which have given good results include diphenylguanidine, a condensation product of acetaldehyde and aniline known as ethlidene aniline, hexamethylenetetramine, and a condensation product of methylamine and formaldehyde (referred to below as trimene). However, the results with sulfur-free accelerators are generally inferior to those with sulfur-bearing accelerators.

In making each of the cures recorded below, forty pounds steam pressure (141° C.) was used for the time indicated, except in Examples 9–20 where fifty pounds steam pressure, i. e. 148° C., was employed. Each sample was tested for (1) tensile strength at 500% elongation; (2) tensile strength at break; and (3) elongation at break, and in each case the results obtained are recorded in this order.

Examples 1–4 show the results obtained with and without tellurium using different percentages of crystalline sulfur and a sulfur-bearing accelerator. Examples 5–8 show the results obtained with different sulfur-bearing accelerators. Examples 9–20 give comparative results with and without tellurium, using various accelerators including sulfur-free accelerators. Examples 21–25 show the results obtained by varying the amount of cystalline sulfur used.

| Formula | #1 | #2 | #3 | #4 |
|---|---|---|---|---|
| Smoked sheets | 100 | 100 | 100 | 100 |
| Zinc oxide | 5 | 5 | 5 | 5 |
| Stearic acid | 2 | 2 | 2 | 2 |
| Mercaptobenzothiazole | 1 | 1 | 1 | 1 |
| Sulfur | ¼ | ¼ | 2 | 2 |
| Tellurium | | 2 | | 2 |

*Cured in slab mold at 40 lbs. (141° C.) for time indicated*

| Formula | 15 Minutes | 30 Minutes |
|---|---|---|
| #1 | Undercure | Undercure |
| #2 | Undercure | 120 1680 890 |
| #3 | Undercure | 80 530 970 |
| #4 | 390 890 | 120 1460 850 |

| Formula | 45 Minutes | 60 Minutes |
|---|---|---|
| #1 | Undercure | 75 460 830 |
| #2 | 145 1810 890 | 150 2350 910 |
| #3 | 115 1300 960 | 160 1890 840 |
| #4 | 160 1850 870 | 240 2610 830 |

*Cured in slab mold at 40 lbs. (141° C.) for time indicated—Continued*

| Formula | #5 | #6 | #7 | #8 |
|---|---|---|---|---|
| Smoked sheets | 50 | 50 | 50 | 50 |
| Pale crepe | 50 | 50 | 50 | 50 |
| Zinc oxide | 5 | 5 | 5 | 5 |
| Stearic acid | 2 | 2 | 2 | 2 |
| Sulfur | 1½ | 1½ | 1½ | 1½ |
| Tellurium | 1 | 1 | 1 | 1 |
| Mercaptobenzothiazole | 1 | | | |
| Me₂N.CS.S.S.CS.NMe₂ | | ¼ | | |
| (Et₂N.CSS)₄Se | | | ¼ | |
| (Et₂N.CSS)₄Te | | | | ¼ |

*Cured in slab mold at 141° C. for time indicated*

| Formula | 5 Minutes | | | 10 Minutes | | |
|---|---|---|---|---|---|---|
| #5 | Undercure | | | --- | 410 | 900 |
| #6 | 280 | 2920 | 805 | 520 | 3800 | 750 |
| #7 | 155 | 1740 | 820 | 275 | 3090 | 750 |
| #8 | 80 | 1450 | 880 | 195 | 2420 | 840 |

| Formula | 15 Minutes | | | 30 Minutes | | | 45 Minutes | | |
|---|---|---|---|---|---|---|---|---|---|
| #5 | 80 | 1620 | 900 | 190 | 2550 | 835 | 280 | 3010 | 800 |
| #6 | 590 | 4010 | 705 | 710 | 4180 | 690 | 670 | 3860 | 700 |
| #7 | 390 | 3520 | 760 | 470 | 3560 | 720 | 470 | 3540 | 730 |
| #8 | 280 | 3150 | 820 | 320 | 3450 | 815 | 330 | 3320 | 750 |

| Formula | #9 | #10 | #11 | #12 | #13 | #14 |
|---|---|---|---|---|---|---|
| Smoked sheets | 100 | 100 | 100 | 100 | 100 | 100 |
| Zinc oxide | 5 | 5 | 5 | 5 | 5 | 5 |
| Stearic acid | 1 | 1 | 1 | 1 | 1 | 1 |
| Tellurium | 1 | 1 | | 1 | | |
| Sulfur | 1.5 | 1.5 | 1.5 | 1.5 | 1.5 | 1.5 |
| Mercaptobenzothiazole | 1 | 1 | | | | |
| Me₂N.CS.S.S.CS.NMe₂ | | | .25 | .25 | | |
| Diphenylguanidine | | | | | 1.5 | 1.5 |

| Formula | #15 | #16 | #17 | #18 | #19 | #20 |
|---|---|---|---|---|---|---|
| Smoked sheets | 100 | 100 | 100 | 100 | 100 | 100 |
| Zinc oxide | 5 | 5 | 5 | 5 | 5 | 5 |
| Stearic acid | 1 | 1 | 1 | 1 | 1 | 1 |
| Tellurium | 1 | | 1 | | 1 | |
| Sulfur | 1.5 | 1.5 | 1.5 | 1.5 | 1.5 | 1.5 |
| Ethylidene aniline | 2 | 2 | | | | |
| "Trimene" | | | 2 | 2 | | |
| Hexamethylenetetramine | | | | | 3 | 3 |

*Cured in slab mold at 50 lbs. (148° C.) for time indicated*

| Formula | 5 minutes | | | 10 minutes | | |
|---|---|---|---|---|---|---|
| #9 | 150 | 1385 | 820 | 500 | 2420 | 770 |
| #10 | 155 | 1140 | 770 | 275 | 2160 | 760 |
| #11 | 545 | 3360 | 725 | 815 | 3210 | 660 |
| #12 | 345 | 2560 | 760 | 380 | 2480 | 740 |
| #13 | 86 | 740 | 740 | 160 | 1495 | 805 |
| #14 | 120 | 830 | 760 | 155 | 1170 | 740 |
| #15 | 125 | 1140 | 800 | 275 | 2030 | 790 |
| #16 | 120 | 1100 | 790 | 255 | 1790 | 730 |
| #17 | 130 | 1050 | 810 | 215 | 1840 | 750 |
| #18 | 125 | 760 | 720 | 210 | 1570 | 740 |
| #19 | --- | 430 | 770 | 155 | 1000 | 770 |
| #20 | 80 | 470 | 760 | 155 | 940 | 740 |

| Formula | 20 Minutes | | | 30 Minutes | | |
|---|---|---|---|---|---|---|
| #9 | 435 | 2590 | 715 | 445 | 2310 | 710 |
| #10 | 350 | 2140 | 720 | 370 | 2120 | 730 |
| #11 | 760 | 3210 | 640 | 720 | 3180 | 650 |
| #12 | 325 | 2300 | 740 | 290 | 2060 | 760 |
| #13 | 300 | 1940 | 760 | 370 | 2550 | 730 |
| #14 | 295 | 2090 | 760 | 325 | 2450 | 760 |
| #15 | 320 | 2400 | 740 | 365 | 2620 | 750 |
| #16 | 315 | 2080 | 720 | 355 | 2320 | 730 |
| #17 | 375 | 2485 | 750 | 395 | 2560 | 730 |
| #18 | 330 | 2030 | 720 | 390 | 2830 | 740 |
| #19 | 280 | 2010 | 740 | 380 | 2420 | 710 |
| #20 | 275 | 1690 | 730 | 330 | 2240 | 770 |

*Cured in slab mold at 50 lbs. (148° C.) for time indicated—Continued*

| Formula | #21 | #22 | #23 | #24 | #25 |
|---|---|---|---|---|---|
| Smoked sheets | 50 | 50 | 50 | 50 | 50 |
| Pale crepe | 50 | 50 | 50 | 50 | 50 |
| Zinc oxide | 5 | 5 | 5 | 5 | 5 |
| Mercaptobenzothiazole | 1 | 1 | 1 | 1 | 1 |
| Stearic acid | 2 | 2 | 2 | 2 | 2 |
| Tellurium | 2 | 2 | 2 | 2 | 1 |
| Sulfur | .25 | .5 | 1 | 2 | 2 |

*Cured in slab mold at 141° C. for time indicated*

| Formula | 15 Minutes | | | 30 Minutes | | |
|---|---|---|---|---|---|---|
| #21 | Undercure | | | --- | 560 | 1030 |
| #22 | --- | 850 | 880 | --- | 1140 | 925 |
| #23 | --- | 760 | 845 | 120 | 2100 | 860 |
| #24 | 160 | 2270 | 810 | 315 | 2970 | 780 |
| #25 | 160 | 2020 | 820 | 290 | 3010 | 790 |

| Formula | 45 Minutes | | | 60 Minutes | | |
|---|---|---|---|---|---|---|
| #21 | --- | 610 | 870 | --- | 980 | 860 |
| #22 | 80 | 1770 | 880 | 130 | 2080 | 860 |
| #23 | 240 | 2550 | 810 | 245 | 2870 | 790 |
| #24 | 400 | 3500 | 780 | 435 | 3300 | 740 |
| #25 | 405 | 3400 | 740 | 410 | 3200 | 760 |

I claim:

1. The method of vulcanizing rubber which comprises incorporating with the rubber a small percentage of sulfur, a small percentage of tellurium not in excess of about 2% of the rubber, and a small percentage of an organic accelerator, and vulcanizing the resulting mixture at a temperature not in excess of about 160° C.

2. The method of vulcanizing rubber which comprises incorporating with the rubber a small percentage of sulfur, a small percentage of tellurium not in excess of about 2% of the rubber, and a small percentage of a sulfur-bearing organic accelerator, and vulcanizing the resulting mixture at a temperature not in excess of about 160° C.

3. The method of vulcanizing rubber which comprises incorporating with the rubber a small percentage of sulfur not in excess of about 2% of the rubber, a small percentage of tellurium not in excess of about 2% of the rubber, and a small percentage of an organic accelerator, and vulcanizing the resulting mixture at a temperature not in excess of about 160° C.

4. As a new product, vulcanized rubber, characterized by the addition thereto before vulcanization of a small percentage of sulfur not in excess of about 2%, a small percentage of tellurium not in excess of about 2%, and a small percentage of an organic accelerator, such product being vulcanized at a temperature not in excess of about 160° C.

5. The method of vulcanizing rubber which comprises incorporating with the rubber a small percentage of crystalline sulphur, a small percentage of elemental tellurium not in excess of about two per cent of the rubber, and a small amount of an organic accelerator and vulcanizing the resulting mixture at a temperature not in excess of 160° C.

6. The method of vulcanizing rubber which comprises incorporating with the rubber a small percentage of crystalline sulphur, a small percentage of elemental tellurium not in excess of two per cent of the rubber, and a small amount of a sulphur-bearing organic accelerator and vulcanizing the resulting mixture at a temperature not in excess of about 160° C.

7. The method of vulcanizing rubber which comprises incorporating with the rubber a small percentage of crystalline sulphur not in excess of about two per cent of the rubber, a small percentage of elemental tellurium not in excess of about two per cent of the rubber, and a small percentage of an organic accelerator and vulcanizing the resulting mixture at a temperature not in excess of 160° C.

8. The method of vulcanizing rubber which comprises incorporating with the rubber a small percentage of crystalline sulphur, a small percentage of elemental tellurium and a small percentage of a tetra-alkyl-thiurem disulfide and vulcanizing the resulting mixture at a temperature not in excess of about 160° C.

9. The method of vulcanizing rubber which comprises incorporating with the rubber a small percentage of crystalline sulphur, a small percentage of elemental tellurium and a small percentage of mercapto-benzol-thiazole and vulcanizing the resulting mixture at a temperature not in excess of 160° C.

10. As a new product, vulcanized rubber which is characterized by its good aging qualities and further characterized by the addition thereto before vulcanization of a small percentage of sulphur, a small percentage of tellurium and a small percentage of a tetra-alkyl-thiuram-disulfide, such product being vulcanized at a temperature not in excess of about 160° C.

11. As a new product, vulcanized rubber characterized by its good aging qualities and further characterized by the addition thereto before vulcanization of a small percentage of sulphur, a small percentage of tellurium and a small percentage of mercapto-benzol-thiazole, such product being vulcanized at a temperature not in excess of 160° C.

In testimony whereof I affix my signature.

LAURENCE A. EDLAND.